US011029398B2

(12) United States Patent
Hwang et al.

(10) Patent No.: US 11,029,398 B2
(45) Date of Patent: Jun. 8, 2021

(54) LIDAR SYSTEM AND METHOD OF OPERATING THE SAME

(71) Applicant: SAMSUNG ELECTRONICS CO., LTD., Suwon-si (KR)

(72) Inventors: Inoh Hwang, Seongnam-si (KR); Dongjae Shin, Seoul (KR); Jungwoo Kim, Hwaseong-si (KR); Tatsuhiro Otsuka, Suwon-si (KR); Heesun Yoon, Incheon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 569 days.

(21) Appl. No.: 15/888,537

(22) Filed: Feb. 5, 2018

(65) Prior Publication Data

US 2019/0079171 A1  Mar. 14, 2019

(30) Foreign Application Priority Data

Sep. 12, 2017  (KR) .................. 10-2017-0116664

(51) Int. Cl.
| | |
|---|---|
| *G01S 7/487* | (2006.01) |
| *G01S 7/481* | (2006.01) |
| *G01S 17/06* | (2006.01) |
| *G01S 17/42* | (2006.01) |

(52) U.S. Cl.
CPC .......... *G01S 7/4876* (2013.01); *G01S 7/4814* (2013.01); *G01S 7/4815* (2013.01); *G01S 7/4817* (2013.01); *G01S 17/06* (2013.01); *G01S 17/42* (2013.01)

(58) Field of Classification Search
CPC ...... G01S 17/42; G01S 7/4814; G01S 7/4815; G01S 17/06; G01S 7/4817; G01S 7/4876

USPC ......................................................... 356/5.01
See application file for complete search history.

(56) References Cited

U.S. PATENT DOCUMENTS

| | | | | |
|---|---|---|---|---|
| 5,377,219 A | * | 12/1994 | Geiger | ................. G01S 7/4811 356/301 |
| 2014/0158870 A1 | | 6/2014 | DeAntonio et al. | |
| 2014/0376001 A1 | * | 12/2014 | Swanson | ........... G01B 9/02004 356/479 |
| 2016/0084945 A1 | | 3/2016 | Rodrigo et al. | |
| 2016/0294472 A1 | | 10/2016 | Palmer et al. | |

FOREIGN PATENT DOCUMENTS

KR   10-2017-0049453 A   5/2017

* cited by examiner

*Primary Examiner* — Daniel L Murphy
(74) *Attorney, Agent, or Firm* — Sughrue Mion, PLLC

(57) ABSTRACT

Light detection and ranging (LiDAR) systems and methods of operating the LiDAR systems are provided. The LiDAR system includes a light emitter configured to emit first lights of different wavelengths in a vertical direction and at different scanning angles with respect to a horizontal axis, a lens configured to converge second lights that are reflected from objects on which the first lights are emitted, and a light filter comprising an active-type device configured to adjust a transmission central wavelength of the active-type device to the different wavelengths of the first lights that are emitted from the light emitter. The LiDAR system further includes a controller configured to control an operation of the light emitter and the light filter, and a detector configured to detect light from the light emitter, and obtain information about the objects.

10 Claims, 6 Drawing Sheets

LIDAR SYSTEM AND METHOD OF OPERATING THE SAME

CROSS-REFERENCE TO RELATED APPLICATION

This application claims priority from Korean Patent Application No. 10-2017-0116664, filed on Sep. 12, 2017, in the Korean Intellectual Property Office, the disclosure of which is incorporated herein by reference in its entirety.

BACKGROUND

1. Field

Apparatus and methods consistent with example embodiments relate to devices for obtaining information with respect to objects by using light, and more particularly, to light detection and ranging (LiDAR) systems and methods of operating the LiDAR systems.

2. Description of the Related Art

A light detection and ranging (LiDAR) system configured to obtain distances, locations, and depth information of an object may be used in various fields. For example, a LiDAR system may be used as a sensor for an autonomous-vehicle or as a motion capture sensor of a user interface.

Also, a LiDAR system may be used as a depth camera for detecting depth information of objects in drones or industrial fields.

Also, a LiDAR system may be used in a military laser radar or a range sensor of robot navigation.

SUMMARY

Example embodiments may provide light detection and ranging (LiDAR) systems that reduce noise-light together with steering through wavelength variation.

Example embodiments may provide methods of operating the LiDAR systems

According to an aspect of an example embodiment, there is provided a LiDAR system including a light emitter configured to emit first lights of different wavelengths in a vertical direction and at different scanning angles with respect to a horizontal axis, a lens configured to converge second lights that are reflected from objects on which the first lights are emitted, and a light filter comprising an active-type device configured to adjust a transmission central wavelength of the active-type device to the different wavelengths of the first lights that are emitted from the light emitter. The LiDAR system further includes a controller configured to control an operation of the light emitter and the light filter, and a detector configured to detect light from the light emitter, and obtain information about the objects.

The light emitter may include an optical phased array light source.

The active-type device may include a tunable band-pass filter.

The light filter may be arranged between the lens and the detector.

The lens may be arranged between the light filter and the detector.

The lens may include a lens array.

According to an aspect of another example embodiment, there is provided a method of operating a light detection and ranging (LiDAR) system, the method including setting a wavelength of light to be emitted, and applying a light emission starting signal to a light emitter so that the light emitter emits the light of the wavelength that is set. The method further includes adjusting a light transmission central wavelength of a light filter to the wavelength that is set, and detecting whether a vertical direction scanning angle of the light emitter with respect to a horizontal axis is within a preset range.

The method may further include maintaining a present scanning state of the light emitter, in response to the vertical direction scanning angle being detected to be within the preset range.

The method may further include resetting the wavelength of the light to be emitted, in response to the vertical direction scanning angle being detected to be outside the preset range.

The light emitter may include light sources having different phases.

The light filter may include a tunable band-pass filter.

The light emitter may emit the light in a horizontal direction and at different angles with respect to the horizontal axis, until the vertical direction scanning angle is detected to be outside the preset range.

According to an aspect of another example embodiment, there is provided a method of operating a light detection and ranging (LiDAR) system, the method including performing a wavelength tunable scan of a light emitter in a vertical direction, and controlling a central wavelength of a light filter to correspond to the wavelength tunable scan.

The performing of the wavelength tunable scan may include setting a first wavelength of light to be emitted, applying a light emission starting signal to the light emitter so that the light emitter emits the light of the first wavelength that is set, and adjusting the central wavelength of the light filter to the first wavelength that is set. The performing of the wavelength tunable scan may further include detecting whether a vertical direction scanning angle of the light emitter with respect to a horizontal axis is within a preset range, and resetting the first wavelength of the light to be emitted, in response to the vertical direction scanning angle being detected to be outside the preset range.

BRIEF DESCRIPTION OF THE DRAWINGS

The above and/or other aspects and advantages will become apparent and more readily appreciated from the following description of example embodiments, taken in conjunction with the accompanying drawings in which.

DETAILED DESCRIPTION

Figure 1:
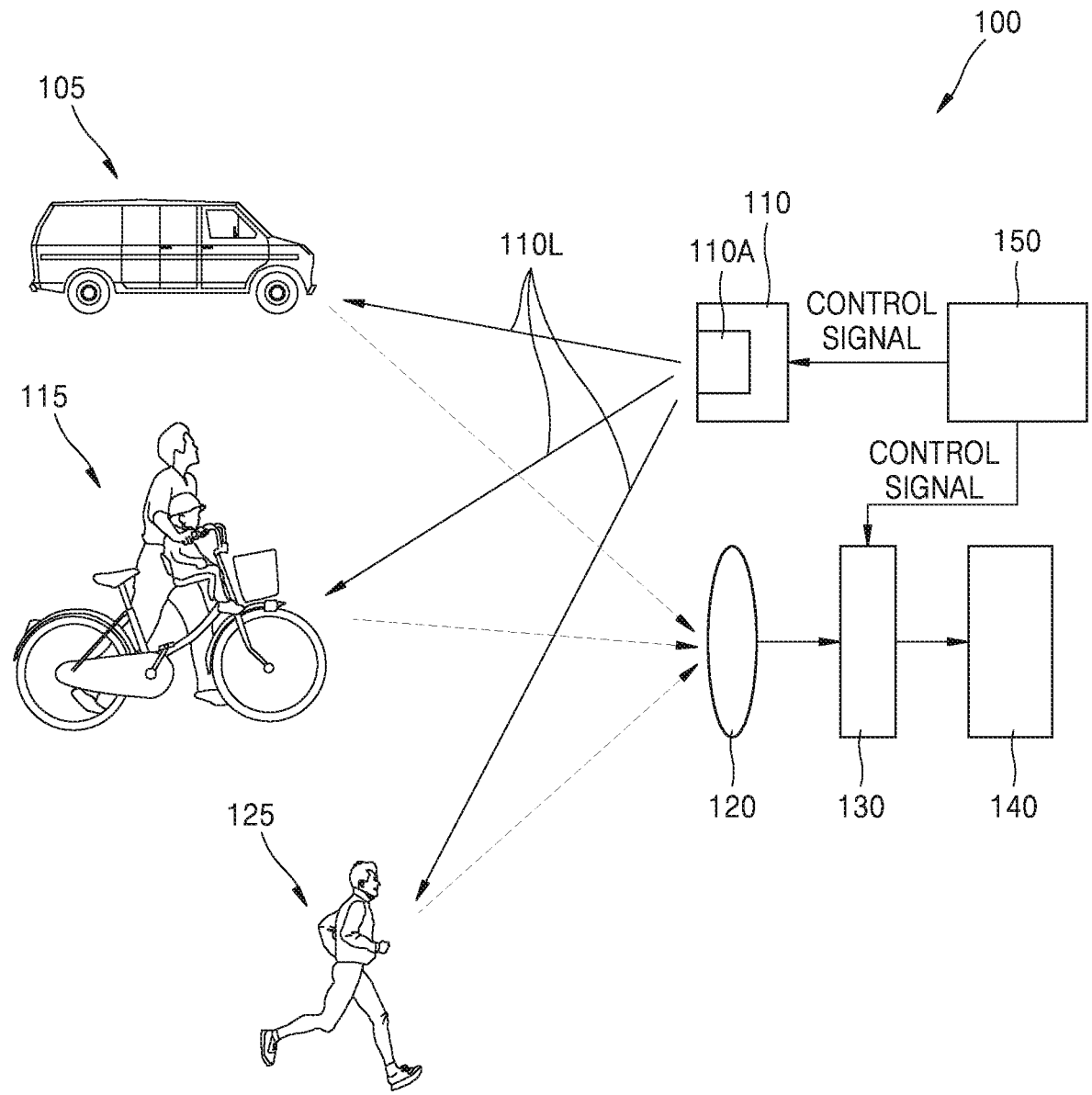
FIG. 1 is a block diagram showing a light detection and ranging (LiDAR) system according to an example embodiment.

In a light detection and ranging (LiDAR) system that forms an image by scanning a peripheral area, using a laser beam, external light, such as sunlight, is noise-light. To reduce the noise-light, a band-pass filter is used, and, in this way, a degree of the noise-light may be reduced.

As a bandwidth of a band-pass filter narrows, the filtering effect of noise-light is high.

When a steering is implemented by a wavelength variation like a Si photonics optical phased array (OPA), because a wavelength range of a light source used is wide, a bandwidth of a band-pass filter is also wide, and, as a result, there is a problem of increasing noise-light.

A LiDAR system disclosed herewith may address at least the above problem, and elements included in the LiDAR system disclosed herewith are provided so that a wavelength of light emitted from a light emitter corresponds to a central wavelength of a band-pass filter in real-time.

Hereinafter, LiDAR systems according to example embodiments and a method of operating the LiDAR systems will be described in detail with reference to the accompanying drawings. In the drawings, thicknesses of layers and regions are exaggerated for clarity of the specification.

FIG. 1 is a block diagram showing a LiDAR system 100 according to an example embodiment.

Referring to FIG. 1, the LiDAR system 100 includes a light emitter 110, a lens 120, a detector 140, and a controller 150. If additional elements are used for obtaining information with respect to first through third objects 105, 115, and 125 and/or for processing obtained information, the LiDAR system 100 may further include elements besides the elements described above. To detect and recognize the first through third objects 105, 115, and 125, light 110L is emitted from the light emitter 110 to the first through third objects 105, 115, and 125.

The number and types of the first through third objects 105, 115, and 125 depicted in FIG. 1 are examples, and thus, are not limited thereto. Various things may be objects. For example, fixed bodies that are not able to move and moving bodies that are movable may be objects, and anything that may reflect light may be in the scope of objects.

The light 110L emitted from the light emitter 110 towards the first through third objects 105, 115, and 125 may be light in an infrared ray range, but is not limited thereto. Any light that is proved as harmless to the human body may be used as the light 110L.

Figure 5:
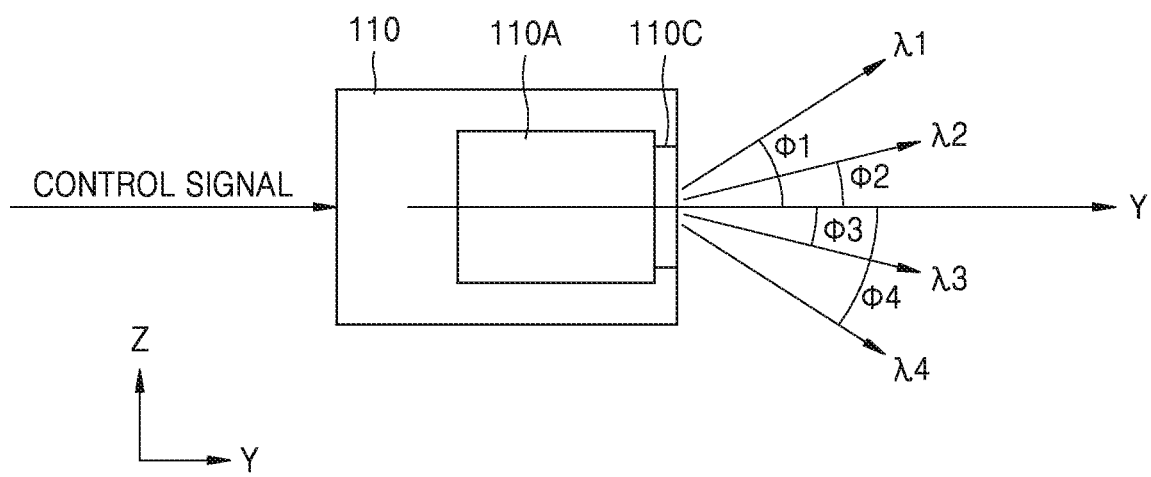
FIG. 5 is a cross-sectional view of a vertical direction scan with respect to a scan region of the LiDAR systems of FIGS. 1 through 3 and the light emitter.

The light emitter 110 includes a light source 110A that emits light. The light source 110A may be light sources that may emit light of various wavelengths, for example, laser light according to provided light emission signals. The light source 110A may include, for example, a Si photonics OPA including a plurality of unit light sources (or cell light sources). A wavelength of the light 110L emitted from the light source 110A may be determined by a control signal provided by the controller 150. The control signal may include a light emission signal. As depicted in FIG. 5, the progress in the vertical direction of the light 110L emitted from the light source 110A may vary according to a wavelength of the light 110L. Because the wavelength of the light 110L emitted from the light source 110A is determined by a control signal provided from the controller 150, the progress in the vertical direction of the light 110L may be controlled through the controller 150.

The light 110L emitted from the light source 110A is reflected by the first through third objects 105, 115, and 125 and enters the lens 120. The lens 120 is depicted as a single lens, but the lens 120 may be a lens optical system including a plurality of lenses that focus incident light to a light filter 130. Light incident to the lens 120 is converged by the lens 120, and afterwards, enters the light filter 130.

The light filter 130 may perform operations that transmit light having a wavelength or light of a wavelength in a bandwidth, and block remaining light. The light filter 130 may be a unit configured to actively perform the operations. To do so, the light filter 130 may include an active-type device configured to transmit light of a central wavelength and to block light of other wavelengths in response to a control signal provided by the controller 150. The control signal provided to the light filter 130 may include information about the central wavelength of light to be transmitted through the active-type device. The central wavelength of light to be transmitted through the active-type device may correspond to a central wavelength of light emitted from the light emitter 110.

As a result, the control signal provided to the light filter 130 may coincide with a central wavelength of light emitted from the light emitter 110 with a central wavelength of light to be transmitted through the active-type device of the light filter 130. The control signal provided to the light filter 130 from the controller 150 may be provided in real-time together with a control signal provided to the light emitter 110 from the controller 150. Therefore, the control of a wavelength of the light 110L emitted from the light emitter 110 and the control of a central wavelength of light to be transmitted through the active-type device of the light filter 130 may be performed in real-time through the controller 150. This may denote that a scan with respect to a scan region including the first through third objects 105, 115, and 125 of the LiDAR system 100 according to an example embodiment is performed in real-time.

With the aid of the active-type device included in the light filter 130, the light filter 130 may selectively transmit desired light and may block other noise-light including natural light. Accordingly, a signal to noise (S/N) ratio of the LiDAR system 100 may be increased. The light filter 130 may include a tunable band-pass filter as an example of the active-type device. A method of operating the tunable band-pass filter may be a liquid crystal method or an acousto-optic method. Light that passed through the light filter 130 enters the detector 140.

The detector 140 senses the light provided from the light filter 130 and acquires information with respect to the first through third objects 105, 115, and 125, based on information included in the sensed light. For example, the detector 140 may detect a time delay or a phase difference information from incident light, and based on the detection result, may obtain distance information to the first through third objects 105, 115, and 125, location information of the first through third objects 105, 115, and 125, and depth images with respect to the first through third objects 105, 115, and 125. For this purpose, the detector 140 may include a time to digital converter (TDC) or an image sensor.

The controller 150 may be arranged between the light emitter 110 and the light filter 130. The controller 150 controls operations of the light emitter 110 and the light filter 130. The controller 150 transmits a light emission starting signal to the light emitter 110 so that the light emitter 110 emits light of a wavelength. That is, the controller 150 may determine a wavelength of light to be emitted. The controller 150 may transmit a control signal including information with respect to an electrical signal used for emitting light of the determined wavelength to the light emitter 110. Accordingly, light having a determined wavelength is emitted from the light emitter 110. The controller 150 transmits a light emission starting signal to the light emitter 110 and simultaneously transmits a control signal to the light filter 130 to control the light filter 130 so that a light transmission central wavelength of the light filter 130 is a wavelength of light emitted from the light emitter 110.

Figure 2:
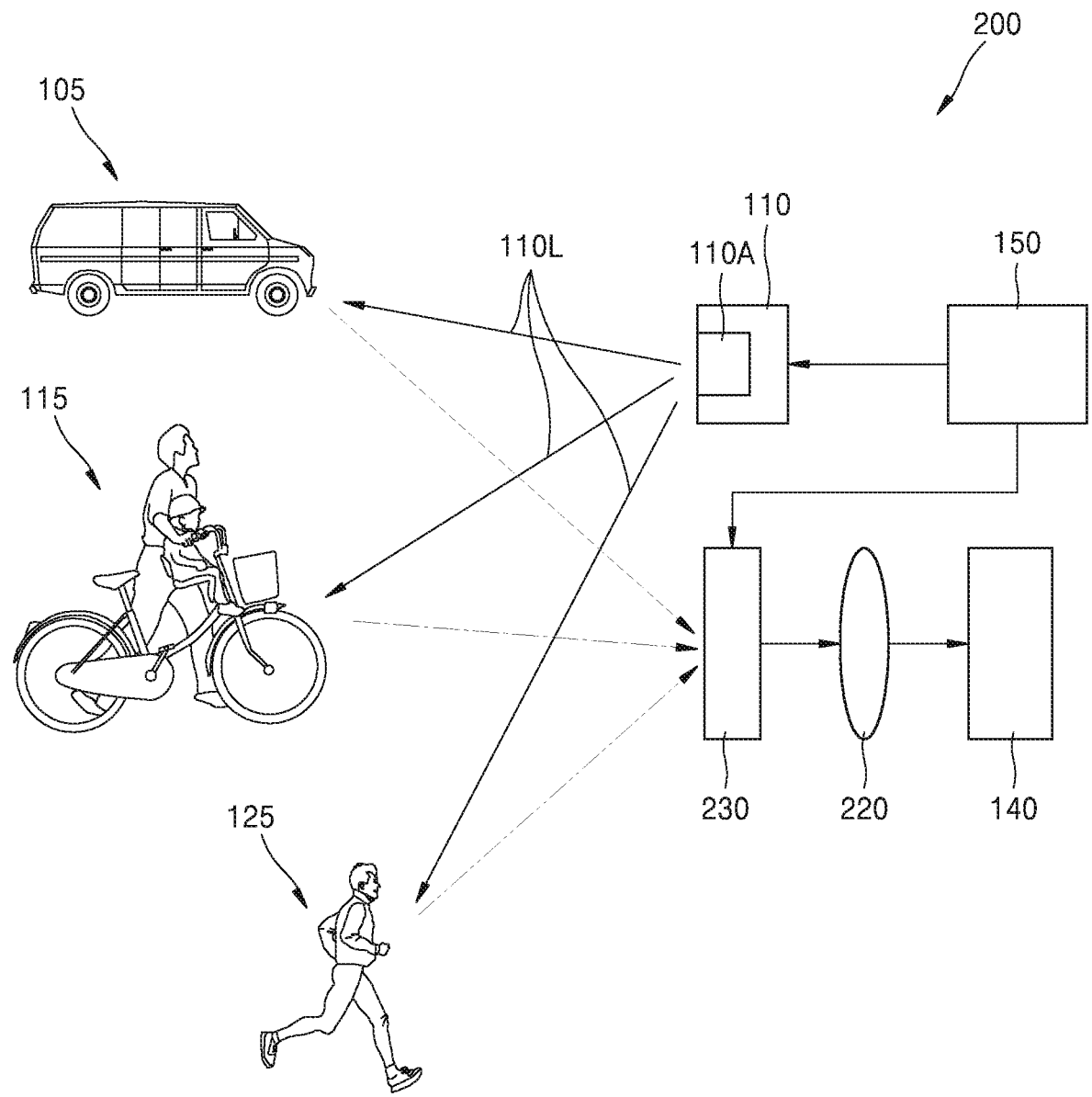
FIG. 2 is a block diagram showing a LiDAR system according to another example embodiment.

FIG. 2 is a block diagram showing a LiDAR system 200 according to another example embodiment. In FIG. 2, like reference numerals are used to indicate elements that are identical to the elements of FIG. 1, and parts of the LiDAR system 200 that are different from the LiDAR system 100 of FIG. 1 will be described. This may also be applied to FIG. 3.

In the LiDAR system 200 of FIG. 2, a lens 220 is arranged between a light filter 230 and the detector 140. Accordingly, light reflected by the first through third objects 105, 115, and 125 firstly enters the light filter 230. Light filtered by the light filter 230 is converged to the detector 140 through the lens 220. The light filter 230 may be identical to the light filter 130 of FIG. 1, but an external size may be different. For example, the light filter 130 of FIG. 1 may have a diameter less than that of the lens 120. In the case of the light filter 230 of FIG. 2, because the light filter 230 is arranged in front of the lens 220, the light filter 230 may have a diameter equal to or greater than that of the lens 220.

Figure 3:
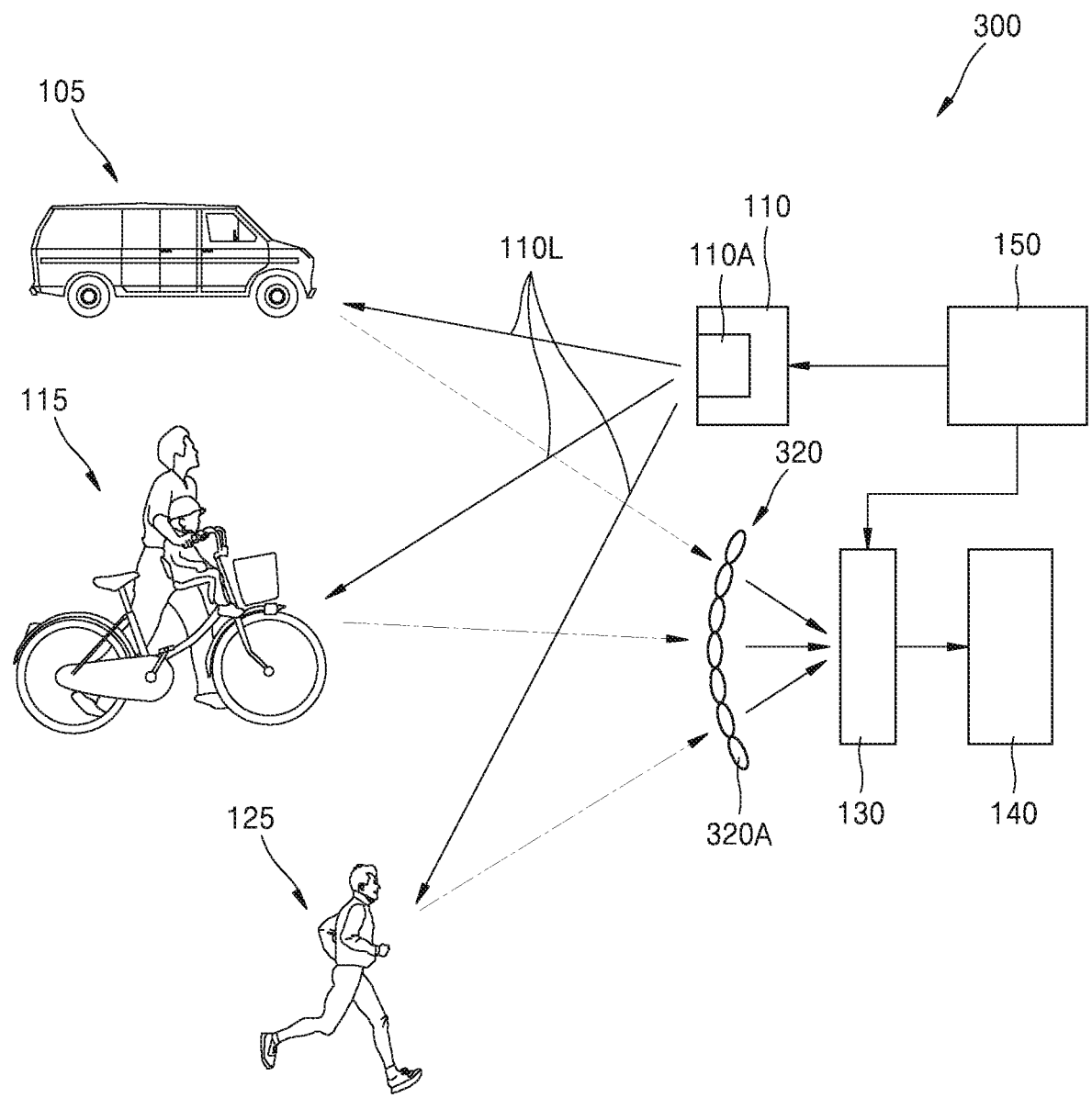
FIG. 3 is a block diagram showing a LiDAR system according to another example embodiment.

FIG. 3 is a block diagram showing a LiDAR system 300 according to another example embodiment.

Referring to FIG. 3, a lens 320 is arranged between the first through third objects 105, 115, and 125 and the light filter 130. The lens 320 includes a lens array. The lens 320 in front of the light filter 130 converges light entering from the first through third objects 105, 115, and 125 to the light filter 130. The lens 320 may have a curvature by which all light entering the lens 320 is focused on the detector 140 through the light filter 130. Accordingly, a resolution with respect to the first through third objects 105, 115, and 125 may be relatively increased. The lens 320 may include a plurality of unit lenses 320A that constitute a lens array.

The lens 220 of FIG. 2 may be replaced by a lens array like the lens 320 of FIG. 3.

Figure 4:
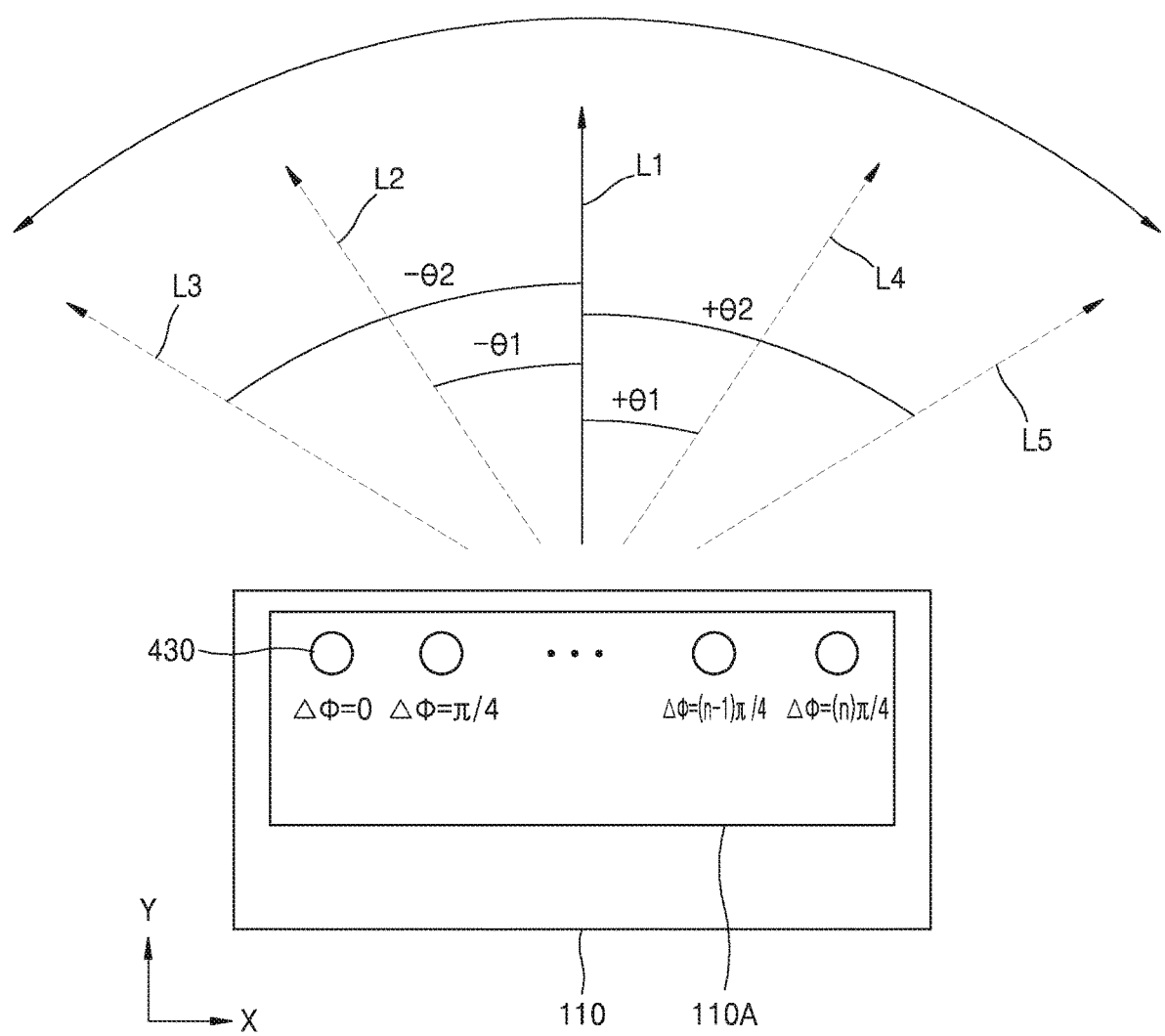
FIG. 4 is a horizontal cross-sectional view of a plurality of unit light sources in a light emitter for explaining a horizontal direction scan with respect to a scan region including an object in the LiDAR systems of FIGS. 1 through 3.

FIG. 4 is a horizontal cross-sectional view showing a plurality of unit light sources 430 in the light emitter 110 for explaining a horizontal direction scan with respect to a scan region including the first through third objects 105, 115, and 125 in the LiDAR systems 100, 200, and 300 of FIGS. 1 through 3. That is, FIG. 4 shows a part of the light emitter 110 taken in a horizontal direction at a height.

Referring to FIG. 4, the light source 110A included in the light emitter 110 includes the unit light sources 430 that constitute an array. The unit light sources 430 may form, for example, an array in a row. The unit light sources 430 may also be referred to as cell light sources. The unit light sources 430 adjacent to each other may have phase differences that are different from each other. In FIG. 4, the unit light sources 430 show that their phase differences $\Delta\phi$ are 0, $\pi/4$, ..., $(n-1)\pi/4$, and $(n)\pi/4$ (n=3, 4, 5, ...) as an example. The phase differences $\Delta\phi$ between the unit light sources 430 may have values different from the values shown in FIG. 4.

Waves emitted from the unit light sources 430 form a wave surface by overlapping each other, and a progressing direction of the wave surface varies according to phase differences $\Delta\phi$ between the unit light sources 430. Accordingly, the progressing direction of light in an X-Y plane, that is, a horizontal plane, may be controlled by controlling the phase differences $\Delta\phi$ between the unit light sources 430. That is, a scanning direction may be controlled in the horizontal plane.

For convenience, first light L1 emitted towards a direct front face from the light source 110A of the light emitter 110 may be regarded as light emitted when a phase difference $\Delta\phi$ between the unit light sources 430 is 0. Second light L2 emitted from the light source 110A is light emitted when the unit light sources 430 form a first phase difference arrangement. The second light L2 progresses in a counter-clockwise direction with a first angle $-\theta1$ with respect to the progressing direction of the first light L1. Third light L3 emitted from the light source 110A is light emitted when the unit light sources 430 form a second phase difference arrangement. The third light L3 progresses in the counter-clockwise direction with a second angle $-\theta2$ with respect to the progressing direction of the first light L1. Fourth light L4 emitted from the light source 110A is light emitted when the unit light sources 430 form a third phase difference arrangement. The fourth light L4 progresses in a clockwise direction with a first angle $+\theta1$ with respect to the progressing direction of the first light L1. Fifth light L5 emitted from the light source 110A is light emitted when the unit light sources 430 form a fourth phase difference arrangement. The fifth light L5 progresses in a clockwise direction with a second angle $+\theta2$ with respect to the progressing direction of the first light L1. For identification convenience, when the angles of other lights L2 through L4 with respect to the progressing direction of the first light L1 are expressed, the clockwise direction is expressed as "+", and the counter-clockwise direction is expressed as "−".

FIG. 5 is a cross-sectional view of a vertical direction scan with respect to a scan region of the LiDAR systems 100, 200, and 300 of FIGS. 1 through 3 and the light emitter 110.

Referring to FIG. 5, an electrical signal for emitting light of a first wavelength $\lambda1$ is applied to the light source 110A of the light emitter 110 in response to a control signal provided from the controller 150. As a result, the light of the first wavelength $\lambda1$ is emitted from the light source 110A through an emitting-window 110C. The light of the first wavelength $\lambda1$ is on a Y-Z plane, and is emitted upwards with a first angle $\phi1$ with respect to the Y axis. If the control signal provided to the light emitter 110 is a signal for emitting light of a second wavelength $\lambda2$, an electrical signal for emitting the light of the second wavelength $\lambda2$ is applied to the light source 110A. As a result, the light of the second wavelength $\lambda2$ is emitted from the light source 110A through the emitting-window 110C. The light of the second wavelength $\lambda2$ is on the Y-Z plane, and is emitted upwards with a second angle $\phi2$ with respect to the Y-axis. The "upwards with respect to the Y-axis" denotes a + direction of the Z-axis. If the control signal provided to the light emitter 110 is a signal for emitting light of a third wavelength $\lambda3$, an electrical signal for emitting the light of the third wavelength $\lambda3$ is applied to the light source 110A. As a result, the light of the third wavelength $\lambda3$ is emitted from the light source 110A on the Y-Z plane through the emitting-window 110C. The light of the third wavelength $\lambda3$ is emitted downwards with a third angle $\phi3$ with respect to the Y-axis. If the control signal provided to the light emitter 110 is a signal for emitting light of a fourth wavelength $\lambda4$, an electrical signal for emitting the light of the fourth wavelength $\lambda4$ is applied to the light source 110A. As a result, the light of the fourth wavelength $\lambda4$ is emitted from the light source 110A through the emitting-window 110C. The light of the fourth wavelength $\lambda4$ is on the Y-Z plane, and is emitted downwards with a fourth angle $\phi4$ with respect to the Y-axis.

In this way, when light is emitted from the Y-Z plane perpendicular to an X-Y plane, the light emitter 110 may emit light in different angles from each other per wavelength according to control signals provided from the controller 150. Accordingly, the LiDAR system 100 according to an example embodiment may scan a scan region as described with reference to FIG. 4 in the horizontal direction (the X-Y plane) and may scan the scan region as described with reference to FIG. 5 in the vertical direction (the Y-Z plane), and thus the LiDAR system 100 may scan the scan region in a 3 dimensional way. Accordingly, information (distance, shape, location, etc.) with respect to various objects present in the scan region may be obtained.

For convenience of explanation, in FIG. 5, it is depicted that lights of first through fourth wavelengths λ1 through λ4 with different angles from each other are sequentially emitted from the light emitter 110 in response to control signals. However, a further number of lights having different wavelengths with different angles may be sequentially emitted from the light emitter 110 in response to control signals.

Referring to FIGS. 4 and 5, in scanning a scan region including first through third objects 105, 115, and 125, the LiDAR systems 100, 200, and 300 may perform a horizontal direction scan, that is, a left-and-right direction scan of a provided scan region by using light of a wavelength allocated to the horizontal direction scan, and may perform a vertical direction scan, that is, an up-and-down scan of the provided scan region by using lights of different wavelengths from each other according to scanning angles. That is, the LiDAR systems 100, 200, and 300 may use a plurality of lights having different wavelengths from each other for 3-dimensionally scanning a scan region.

Next, a method of operating the LiDAR system 100 according to an example embodiment will be described with reference to accompanying drawings.

Figure 6:
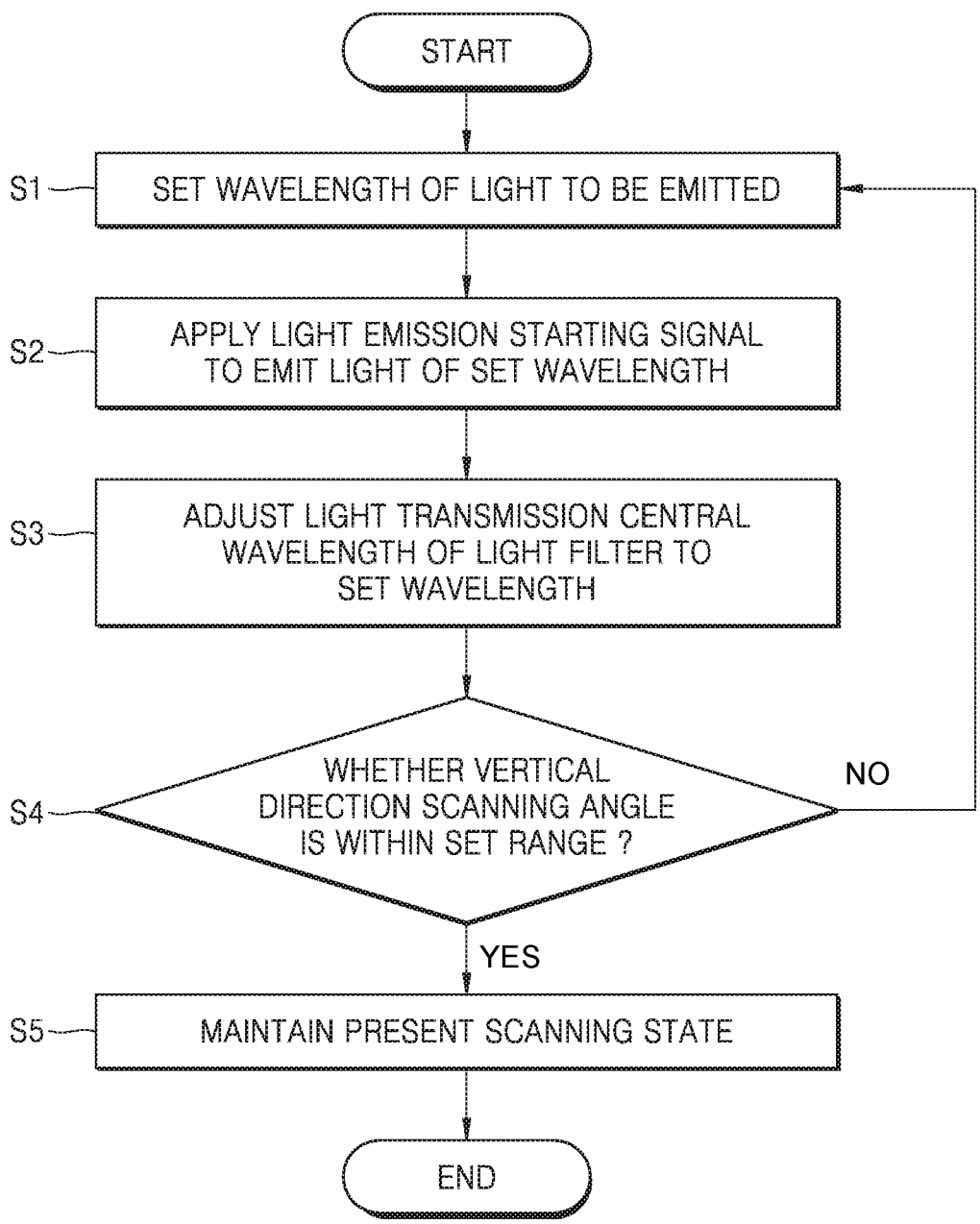
FIG. 6 is a flowchart showing a method of operating a LiDAR system according to an example embodiment.

FIG. 6 is a flowchart showing a method of operating the LiDAR system 100 according to an example embodiment.

Referring to FIGS. 1 through 3 and FIG. 6, in a first operation S1 of the operating method, a wavelength of light to be emitted is set. The wavelength of the light to be emitted may be set or determined by the controller 150.

In a second operation S2 of the operating method, a light emission starting signal is applied to the light emitter 110 to emit a light of the set wavelength. An electrical signal for emitting the light of the set wavelength is generated from the controller 150. The electrical signal is provided to the light emitter 110 from the controller 150 as a control signal. Accordingly, the light emitter 110 emits the light of the set wavelength towards the first through third objects 105, 115, and 125.

In a third operation S3 of the operating method, a light transmission central wavelength of the light filter 130 is adjusted to the set wavelength. The third operation S3 is performed according to a control signal provided from the controller 150. That is, when a wavelength of light to be emitted is set by the controller 150, the controller 150 transmits information with respect to the set wavelength to the light filter 130 as a control signal so that the light filter 130 performs an appropriate filtering operation. The light filter 130 adjusts a light transmission central wavelength of the light filter 130 to the set wavelength according to a control signal provided from the controller 150. Accordingly, of lights entering the light filter 130 after reflecting by the first through third objects 105, 115, and 125, lights besides the light of the set wavelength are blocked. As a result, a signal to noise (S/N) ratio may be increased.

In a fourth operation S4 of the operating method, it is determined whether a vertical direction scanning angle of the LiDAR system 100 is within a set range. The wavelength used for the vertical direction scanning of the LiDAR system 100 varies according to scanning angles. When a vertical direction scanning is performed in a given angle (for example, upwards 20 degrees) and the deviation range of an angle is, for example, ±2 degrees, if the vertical direction scanning is performed with the given angle without deviating from the deviation range (N), the operating method continues in a fifth operation S5.

In the fifth operation S5 of the operating method, a present scanning state is maintained. In the fifth operation S5, the horizontal direction scanning may be continued until the vertical direction scanning angle deviates from the given range, that is, until deviation of the scanning angle exceeds the above deviation range.

If the vertical direction scanning at the given angle is deviated from the deviation range (Y), the operating method returns to the first operation S1 and a new wavelength of light is set. At this point, the new wavelength to be set is a wavelength different from the wavelength used before. Afterwards, the second through fourth operations S2 through S4 are repeated.

The LiDAR systems according to the example embodiments perform a wavelength tunable scanning in a vertical direction by using an OPA light source while using an active-type device configured to control a transmission central wavelength in real time on a side of receiving light reflected by objects. The active-type device may control the transmission central wavelength to correspond to a wavelength of light emitted from the OPA light source in real time in response to a wavelength tunable operation of the OPA light source. In this manner, the penetration of external light may be reduced regardless of a vertical direction wavelength tunable scanning of the OPA light source. As a result, an S/N ratio of a LiDAR system may be increased by reducing noise-light while completely implementing steering by using the OPA light source.

As is traditional in the field of the inventive concepts, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the inventive concepts.

While the example embodiments have been described with reference to the figures, it will be understood by those of ordinary skill in the art that various changes in form and details may be made therein without departing from the spirit and scope as defined by the following claims.

What is claimed is:

1. A light detection and ranging (LiDAR) system comprising:

a light emitter configured to emit first lights of different wavelengths in a vertical scan;

a lens configured to converge second lights that are reflected from objects on which the first lights are emitted;

a light filter comprising an active-type device configured to adjust a transmission central wavelength of the active-type device to the different wavelengths of the first lights are emitted from the light emitter;

a controller configured to:
   set a wavelength of light to be emitted;
   apply a light emission starting signal to the light emitter so that the light emitter emits the light of the set wavelength;
   adjust the light transmission central wavelength of the light filter to the set wavelength;
   in the vertical scan, detect whether a current scanning angle of the emitted light with respect to a horizontal axis of the light emitter is within a preset range;
   based on the current scanning angle being detected to be within the preset range, maintain a present scanning state of the light emitter; and
   based on the current scanning angle being detected to be outside the preset range, reset, to a new wavelength, the wavelength of the light to be emitted; and a detector configured to detect the first lights emitted from the light emitter, and obtain information about the objects.

2. The LiDAR system of claim 1, wherein the light emitter comprises an optical phased array light source.

3. The LiDAR system of claim 1, wherein the active-type device comprises a tunable band-pass filter.

4. The LiDAR system of claim 1, wherein the light filter is arranged between the lens and the detector.

5. The LiDAR system of claim 1, wherein the lens is arranged between the light filter and the detector.

6. The LiDAR system of claim 1, wherein the lens comprises a lens array.

7. A method of operating a light detection and ranging (LiDAR) system, the method comprising:
   setting a wavelength of light to be emitted;
   applying a light emission starting signal to a light emitter so that the light emitter emits the light of the set wavelength;
   adjusting a light transmission central wavelength of a light filter to the set wavelength;
   in a vertical scan, detecting whether a current scanning angle of the emitted light with respect to a horizontal axis of the light emitter is within a preset range;
   based on the current scanning angle being detected to be within the preset range, maintaining a present scanning state of the light emitter; and
   based on the current scanning angle being detected to be outside the preset range, resetting, to a new wavelength, the wavelength of the light to be emitted.

8. The method of claim 7, wherein the light emitter comprises light sources having different phases.

9. The method of claim 7, wherein the light filter comprises a tunable band-pass filter.

10. The method of claim 7, wherein the light emitter emits the light in a horizontal direction until the current scanning angle is detected to be outside the preset range.

* * * * *